United States Patent
Ikeuchi

(10) Patent No.: US 8,303,524 B2
(45) Date of Patent: Nov. 6, 2012

(54) CONTROL DEVICE FOR WALKING ASSIST DEVICE

(75) Inventor: Yasushi Ikeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 818 days.

(21) Appl. No.: 12/482,909

(22) Filed: Jun. 11, 2009

(65) Prior Publication Data

US 2009/0312677 A1   Dec. 17, 2009

(30) Foreign Application Priority Data

Jun. 13, 2008   (JP) .................................. 2008-155905

(51) Int. Cl.
*A61H 1/00* (2006.01)
*A61F 5/00* (2006.01)
*A47D 13/04* (2006.01)
(52) U.S. Cl. ................. 601/34; 601/35; 602/23; 482/66
(58) Field of Classification Search ............... 601/5, 33, 601/34, 35; 602/16, 23, 24, 25, 5, 18, 19; 623/25, 30; 600/595; 607/48–49; 482/66, 482/128
See application file for complete search history.

(56) References Cited

FOREIGN PATENT DOCUMENTS

| JP | 2003-116893 | 4/2003 |
|----|-------------|--------|
| JP | 2007-054616 | 3/2007 |
| JP | 2007-330299 | 12/2007 |
| JP | 2008-017981 | 1/2008 |

*Primary Examiner* — Kevin C Sirmons
*Assistant Examiner* — Ophelia A Hawthorne
(74) *Attorney, Agent, or Firm* — Rankin, Hill & Clark LLP

(57) ABSTRACT

A control device for a walking assist device is provided. The control device has a means that decides whether the total sum of measured values of treading forces of the legs of a user is greater than a predetermined value and a means which determines a predetermined ratio according to observed values or desired values of reference parameters obtained immediately before a negative determination result by using supporting forces acting on the leg links from the floor side as the reference parameters. This is in the case where the determination result of the decision means is negative and is a process undertaken instead of determining the predetermined ratio between the supporting forces acting on the leg links according to the measured values of the treading forces of the legs of the user.

4 Claims, 8 Drawing Sheets

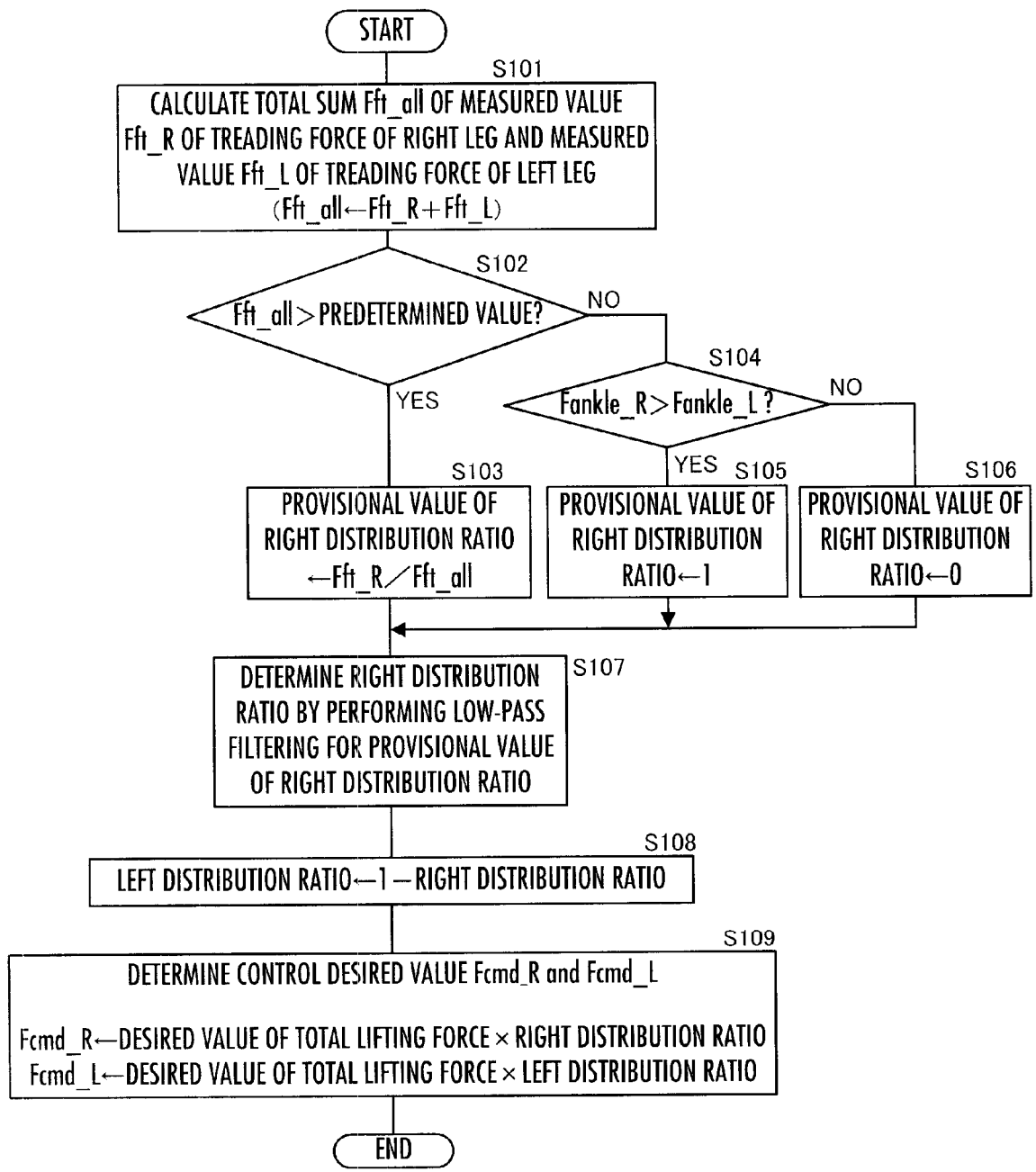

CONTROL DEVICE FOR WALKING ASSIST DEVICE

BACKGROUND OF THE INVENTION

1. Field of the Invention

The present invention relates to a control device for a walking assist device which assists a user (person) in walking.

2. Description of the Related Art

Conventionally, the applicant of the present application proposed this type of walking assist device, for example, in Japanese Patent Application Laid-Open No. 2007-54616 (hereinafter, referred to as Patent Document 1) and Japanese Patent Application Laid-Open No. 2007-330299 (hereinafter, referred to as Patent Document 2).

These Patent Documents 1 and 2 disclose a walking assist device including a seat member on which a user is seated in a straddling manner, a pair of left and right foot attachment portions fitted to the left and right feet of the user, respectively, and a pair of left and right leg links interconnecting the seat member and the left and right foot attachment portions, respectively.

In this walking assist device, each leg link includes a thigh frame extending from the seat member via a first joint (hip joint), a crus frame extending from the foot attachment portion via a second joint (ankle joint), and a third joint (knee joint) that interconnects the thigh frame and the crus frame so that the frames freely bend and stretch between the first joint and the second joint. Moreover, an electric motor for driving the third joint is mounted at an end of the thigh frame on the first joint side of each leg link. Further, in a state where the foot attachment portion is in contact with the ground, the walking assist device applies a driving torque to the third joint of the leg link in the stretching direction of the leg link from the electric motor. Thereby, the walking assist device causes a lifting force to be applied to the user from the seat member and consequently bears a part of the weight of the user.

In this instance, the walking assist device controls the motion thereof as described below. Specifically, a desired total lifting force as a total supporting force (translational force), which is required to support a part of the weight of the user and the weight of the walking assist device on the floor, is distributed to the leg links at a ratio based on the treading forces of the legs of the user measured from the outputs of treading force measurement force sensors provided on the foot attachment portions. This determines the desired values of the supporting forces applied to the leg links from the floor side (the desired shares of the leg links of the desired total lifting force). In this case, the desired values of the supporting forces of the leg links are determined so that the mutual proportion between the desired values of the supporting forces of the left and right leg links is the same as the mutual proportion between the treading forces of the left and right legs of the user. Moreover, supporting forces actually acting on the leg links from the floor side are measured from the outputs of force sensors, each of which is interposed between the crus frame and the second joint of the corresponding leg link. Further, an output torque of the electric motor is feedback-controlled for each leg link so that a measured value of the supporting force coincides with the desired value. This allows the output torque of each electric motor to be controlled so that the desired lifting force acts on the user (a translational force supporting a part of the weight of the user) from the seat member.

The above walking assist device is capable of effectively reducing the load on the legs in walking of the user since the walking assist device generates forces in the leg links so as to match the treading forces of the legs of the user, in other words, so as to match the motion of the legs intended by the user.

In the techniques disclosed in Patent Documents 1 and 2, the treading force measurement force sensors mounted on each of the foot attachment portions are opposed to the base of the foot of the user's leg at two places (the metatarsophalangeal joint and the heel). Further, the total sum of forces (vertical translational forces) detected by the two force sensors on each foot attachment portion is measured as a treading force of the user's leg corresponding to the foot attachment portion. In this case, in a state where the user's leg is a standing leg, basically the treading force of the user's leg acts on one or both of the two force sensors on the foot attachment portion on the standing leg side. Therefore, it is possible to measure the treading force from the outputs of the force sensors.

Experiments and investigations of the present inventor, however, proved that, in a state where one of the legs is a standing leg, the foot attachment portion sometimes temporarily comes in contact with the floor at a place deviating from either of the places where the force sensors are mounted during a period from the time point at which the foot attachment portion on the standing leg side comes in contact with the floor to the time point at which the foot attachment portion leaves from the floor, according to how the foot attachment portion comes in contact with the floor or leaves the floor in walking of the user or according to unevenness of the floor. In such instance, the measured value of the treading force based on the two force sensors on the attachment portion is very low in comparison with an actual treading force even if the foot attachment portion is in contact with the floor.

This situation, if occurs, causes the problem described below. For example, in a shift from the one-leg supporting period in which only one leg of the user is a standing leg to the two-leg supporting period in which both legs are standing legs, the treading force of a free leg (hereinafter, referred to as the first leg) in the one-leg supporting period is equal to zero or very small while the treading force of the other leg (hereinafter, referred to as the second leg) is sufficiently larger than the treading force of the first leg, during the period between the time points immediately before and immediately after the start of the two-leg supporting period. During the period between the time points immediately before and immediately after the start of the two-leg supporting period, however, normally the foot attachment portion for the second leg comes in contact with the floor only at a toe-side point. Moreover, the floor contact point of the foot attachment portion for the second leg may deviate from any mounting points of the treading force measurement sensors for the second leg in some cases, depending on how the foot attachment portion for the second leg comes in contact with the floor or depending on the unevenness of the floor surface. Consequently, any of the treading force measurement sensors does not respond to the treading force of the second leg almost at all in some cases.

In such a case, the measured values of the treading forces of the legs are both zero, or the measured value of the treading force of the second leg is smaller than the measured value of the treading force of the first leg as opposed to the magnitude relation in actual treading forces between the legs. If so, it is difficult to set the proportion between a desired value of the supporting force applied to the leg link for the first leg and a desired value of the supporting force applied to the leg link for the second leg to a proportion adjusted to a proportion between an actual treading force of the first leg and an actual treading force of the second leg. As a result, the magnitude relation between the desired values of the supporting forces respectively applied to the leg links may be reverse to the magnitude relation between the actual treading force of the first leg and the actual treading force of the second leg.

If a situation occurs where any of the treading force measurement sensors does not respond to the treading force of the supporting leg almost at all because the floor contact point of the foot attachment portion for the supporting leg deviates from all of the mounting points of the treading force measurement sensors for the second leg, the measured values of the treading forces of the legs are both very small and do not match actual treading forces. Furthermore, as described above, it may be difficult to set the proportion between the desired values of the supporting forces applied to the leg links to the proportion adjusted to the proportion between the actual treading forces of the legs in some cases. This may lead to discomfort of the user due to a sudden change in the supporting forces applied to the leg links.

To solve the above problem, it is conceivable that each foot attachment portion is provided with a larger number of force sensors so that at least one of the force sensors responds to the treading force even if any points of the foot attachment portion come in contact with the floor. This method, however, causes a significant increase in cost of manufacturing the walking assist device. Moreover, this method requires a large number of wirings for connections to the large number of force sensors for the treading force measurement and thus the wirings could interfere with a motion of the legs of the user or with the downsizing and lightweighting of the walking assist device.

SUMMARY OF THE INVENTION

The present invention has been made in view of the above background, and therefore it is an object of the present invention to provide a control device for a walking assist device, capable of preventing a proportion between supporting forces acting on the leg links respectively from the floor side from being inconsistent with a proportion between actual treading forces of the legs of a user, even in the case where a foot attachment portion comes in contact with the floor at a point deviating from any mounting points of the treading force measurement force sensors, without a large number of the treading force measurement force sensors mounted on the foot attachment portions.

To achieve the above object, the present invention provides a control device for a walking assist device that has: a lifting force transmitting portion which is put in contact with the trunk of a user so as to allow an upward lifting force to act on the trunk of the user; a pair of left and right foot attachment portions fitted to the feet of the legs of the user; a pair of left and right leg links which connect the foot attachment portions to the lifting force transmitting portion, respectively, each of the leg links including a thigh frame extending from the lifting force transmitting portion via a first joint, a crus frame extending from each foot attachment portion via a second joint, and a third joint interconnecting the thigh frame and the crus frame so as to freely bend and stretch the thigh and crus frames; and actuators each of which drives the third joint of the corresponding leg link, wherein the control device has a treading force measuring means which measures treading forces of the legs of the user based on outputs of treading force measurement force sensors mounted on the foot attachment portions, respectively, so as to be each opposed to the base of the foot of the corresponding leg of the user, and controls driving forces of the actuators so that a proportion between supporting forces respectively acting on the leg links from the floor side coincides with a predetermined ratio determined according to the measured values of the treading forces of the legs obtained by the treading force measuring means while applying a desired lifting force to the trunk of the user from the lifting force transmitting portion; and wherein the control device comprises: a treading force total sum decision means which decides whether or not the total sum of the measured values of the treading forces of the legs obtained by the treading force measuring means is greater than a predetermined value; and a predetermined ratio determining means which determines the predetermined ratio, according to observed values of reference parameters which have been observed based on outputs of sensors mounted on the leg links other than the treading force measurement force sensors or desired values of the reference parameters which have been used for the control processing of the driving forces of the actuators immediately before the negative determination result of the treading force total sum decision means, by using the supporting forces acting on each of the leg links from the floor side, driving torques of the third joints of each of the leg links, or physical quantities having correlation with the supporting forces or the driving torques as reference parameters for determining the predetermined ratio, instead of determining the predetermined ratio according to the measured values of the treading forces of the legs of the user, in the case where the determination result of the treading force total sum decision means is negative (a first aspect of the invention).

In the following description, the first leg is a free leg immediately before the start of a two-leg supporting period and the second leg is the other leg during a shift from the one-leg supporting period in which only one leg of the user is a standing leg to the two-leg supporting period in which both legs are standing legs, as described above.

According to the first aspect of the invention, for example, in the case where the foot attachment portion for the second leg comes into contact with the floor at a place deviating from any mounting points of the treading force measurement force sensors mounted on the foot attachment portion during the shift from the one-leg supporting period to the two-leg supporting period in walking of the user, the determination result of the treading force total sum decision means is negative. In this case, the predetermined ratio determining means determines the predetermined ratio, which is a desired proportion between the supporting forces acting on the leg links respectively from the floor side, according to the observed values or desired values of the reference parameters obtained immediately before the negative determination result of the treading force total sum decision means, instead of determining the predetermined ratio according to the measured values of the treading forces of the legs of the user.

In the state where the determination result of the treading force total sum decision means is affirmative, the driving forces of the actuators are controlled so that the proportion between the supporting forces acting on the leg links respectively from the floor side coincides with the predetermined ratio, which is determined according to the measured values of the treading forces of the legs obtained by the treading force measuring means. Thus, the observed values or desired values of the reference parameters for the leg links, which have been obtained immediately before the negative determination result of the treading force total sum decision means, reflect the proportion between the actual treading forces of the legs of the user.

Therefore, the control device is capable of controlling the driving forces of the actuators so that the proportion between the supporting forces acting on the leg links respectively from the floor side coincides with the proportion between the actual treading forces of the legs of the user by determining the predetermined ratio according to the observed values or the desired values of the reference parameters in the case where the determination result of the treading force total sum decision means is negative.

Hence, according to the first aspect of the invention, the control device is capable of preventing the proportion between the supporting forces acting on the leg links respectively from the floor side from being inconsistent with the proportion between actual treading forces of the legs of the user even in the case where a foot attachment portion comes in contact with the floor at a point deviating from any mounting points of the treading force measurement force sensors, without a large number of treading force measurement force sensors mounted on each foot attachment portion.

In a more specific embodiment of the first aspect of the invention, the control device further includes: a supporting force measuring means which respectively measure supporting forces actually acting on the leg links from the floor side on the basis of outputs of supporting force measurement force sensors each interposed between the crus frame and the second joint of each of the leg links; a supporting force desired value determining means which determines desired values of the supporting forces respectively acting on the leg links from the floor side so that a proportion between the desired values coincides with the predetermined ratio; and an actuator control means which feedback-controls the driving forces of the actuators so that the measured values of the supporting forces of the leg links obtained by the supporting force measuring means follow the desired values determined by the supporting force desired value determining means. In this case, preferably the predetermined ratio determining means uses the measured values of the supporting forces of each of the leg links obtained by the supporting force measuring means or the desired values of the supporting forces of each of the leg links obtained by the supporting force desired value determining means as the reference parameters (a second aspect of the invention).

According to the second aspect of the invention, the supporting force measuring means respectively measure supporting forces actually acting on the leg links from the floor side. Moreover, the desired values of the supporting forces acting on the leg links respectively from the floor side are determined so that the proportion between the supporting forces coincides with the predetermined ratio. Further, the driving forces of the actuators are feedback-controlled so that the measured values of the supporting forces follow the desired values. Accordingly, the proportion between the measured values of the supporting forces of the leg links or the proportion between the desired values of the supporting forces is consistent with the proportion between the actual treading forces of the legs of the user in a state where the determination result of the treading force total sum decision means is affirmative. Therefore, the control device is capable of appropriately determining the predetermined ratio so as to be consistent with the proportion between the actual treading forces of the legs of the user, in the case where the determination result of the treading force total sum decision means is negative, by using the measured values of the supporting forces of the leg links obtained by the supporting force measuring means or the desired values of the supporting forces of the leg links obtained by the supporting force desired value determining means as the reference parameters.

In the second aspect of the invention, more specifically, it is preferable, for example, that the predetermined ratio determining means determines the predetermined ratio so that the desired value of the supporting force of a second leg link is greater than the desired value of the supporting force of a first leg link, where the first leg link is one of the leg links having a smaller value of the reference parameter and the second leg link is the other leg link having a greater value of the reference parameter, in the case where the determination result of the treading force total sum decision means is negative (a third aspect of the invention).

Specifically, if the determination result of the treading force total sum decision means is negative and further the measured value (or observed value) of the supporting force as the reference parameter value for the second leg link is greater than the measured value (or observed value) of the supporting force as the reference parameter value for the first leg link obtained immediately before the negative determination result, it is normally considered that the actual treading force for the second leg link is greater than the actual treading force for the first leg link.

Therefore, the control device is capable of matching the proportion between the desired values of the supporting forces with the proportion between the actual treading forces of the user by determining the predetermined ratio so that the desired value of the supporting force of the second leg link is greater than the desired value of the supporting force of the first leg link.

Further, in the second aspect of the invention, for example, the predetermined ratio determining means may determine the predetermined ratio so that the desired value of the supporting force of a first leg link is a negative value and the desired value of the supporting force of a second leg link is a positive value, where the first leg link is one of the leg links having a smaller value of the reference parameter and the second leg link is the other leg link having a greater value of the reference parameter, in the case where the determination result of the treading force total sum decision means is negative (a fourth aspect of the invention). In the fourth aspect of the invention, the positive value of the desired value of the supporting force means that the foot attachment portion is pressed against the floor surface to apply an upward floor reaction force to the foot attachment portion, regarding the sign of the desired value of the supporting force of each leg link. Moreover, the negative value of the desired value of the supporting force means that the foot attachment portion is being lifted to leave the floor.

Specifically, if the determination result of the treading force total sum decision means is negative and further the measured value (or desired value) of the supporting force as the reference parameter value for the second leg link is greater than the measured value (or desired value) of the supporting force as the reference parameter value for the first leg link obtained immediately before the negative determination result, the user might move the leg on the first leg link side and the leg on the second leg link side as a free leg and a supporting leg, respectively.

Therefore, the control device is capable of matching the proportion between the desired values of the supporting forces with the proportion between the actual treading forces of the user and with the motion of the legs intended by the user by determining the predetermined ratio so that the desired value of the supporting force of the first leg link is a negative value and that the desired value of the supporting force of the second leg link is a positive value.

In the third or fourth invention, where the predetermined ratio between the desired value of the supporting force of the first leg link and the desired value of the supporting force of the second leg link is a:b (a+b=1), "a" is preferably a value close to zero ("a" may be equal to zero in the third invention) and "b" is preferably a value close to 1 ("b" may be equal to 1 in the third invention).

BRIEF DESCRIPTION OF THE DRAWINGS

FIG. 8 is a flowchart illustrating a processing of a left/right desired share determining means shown in FIG. 6.

DETAILED DESCRIPTION OF THE PREFERRED EMBODIMENTS

Figure 1:
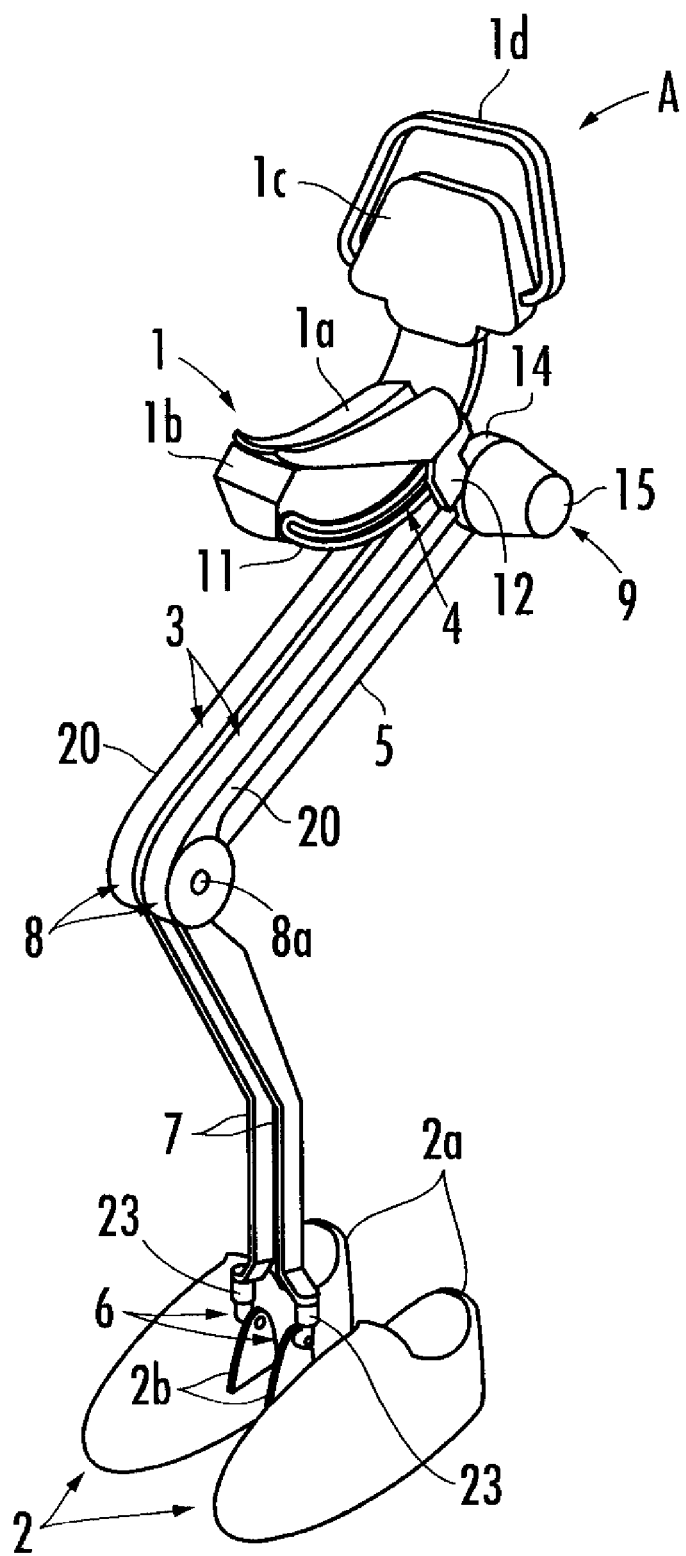
FIG. 1 is a perspective diagram illustrating a walking assist device according to one embodiment of the present invention.

An embodiment of the present invention will be described in detail hereinafter. First, a mechanical configuration of a walking assist device of this embodiment is described with reference to FIGS. 1 to 4.

As shown, the walking assist device A of this embodiment includes a seat member 1 as a lifting force transmitting portion, a pair of left and right foot attachment portions 2 and 2 fitted to the feet of the legs of a user P, and a pair of left and right leg links 3 and 3 connecting the foot attachment portions 2 and 2 to the seat member 1. The left and right foot attachment portions 2 and 2 have the same structure and are symmetrical with each other. The left and right leg links 3 and 3 have the same structure and are symmetrical with each other, too.

The leg link 3 includes a thigh frame 5 extending downward from the seat member 1 via a first joint 4, a crus frame 7 extending upward from the foot attachment portion 2 via a second joint 6, and a third joint 8 which is located between the first joint 4 and the second joint 6 to interconnect the thigh frame 5 and the crus frame 7 so that the frames freely bend and stretch.

Further, the walking assist device A has an actuator 9 which generates a driving force for driving the third joint 8 and a power transmission system 10 which transmits the driving force of the actuator 9 to the third joint 8 to apply a driving torque around a joint axis of the third joint 8 thereto for each leg link 3.

The seat member 1 includes a saddle-shaped seat 1a on which the user P is seated in a straddling manner (in a manner that the seat member 1 is positioned between the root ends of the legs of the user P), a supporting frame 1b attached to the undersurface of the seat 1a, and a hip cushion 1c mounted at the rear end (a raised portion which is raised upward at the back side of the seat 1a) of the supporting frame 1b. Additionally, the hip cushion 1c is provided with an arched gripper 1d that allows the user P to grip.

Although the lifting force transmitting portion is formed by the seat member 1 with the saddle-shaped seat 1a in this embodiment, it is possible to use, for example, a harness-shaped flexible member as shown in FIG. 16 of Patent Document 1, instead. Preferably, the lifting force transmitting portion has a part in contact with the user P between the root ends of the legs in order to apply an upward lifting force to the trunk of the user P.

The first joint 4 of each leg link 3 has two degrees of freedom of rotation (two degrees of freedom) around two joint axes in the anteroposterior direction and in the horizontal direction. More specifically, the first joint 4 has an arc-shaped guide rail 11 connected to the seat member 1. The guide rail 11 is movably engaged with a slider 12 fixed to the top end of the thigh frame 5 of each leg link 3 via a plurality of rollers 13 rotatably attached to the slider 12. This enables the leg link 3 to make a swing motion in the anteroposterior direction (back and forth rocking motion) around a first joint axis of the first joint 4, where the first joint axis is a horizontal axis passing through the center of curvature 4a (See FIG. 2) of the guide rail 11 (more specifically, an axis in a direction perpendicular to the plane including the arc of the guide rail 11).

Moreover, the guide rail 11 is pivotally supported at the rear end (raised portion) of the supporting frame 1b of the seat member 1 via a spindle 4b whose central axis is oriented in the anteroposterior direction so as to be swingable around the central axis of the spindle 4b. This enables each leg link 3 to perform a swing motion in the horizontal direction around a second joint axis of the first joint 4, namely, an adduction and abduction motion, where the second joint axis is the central axis of the spindle 4b. In this embodiment, the second joint axis of the first joint 4 is a common joint axis between the left first joint 4 and the right first joint 4.

As described above, the first joint 4 is adapted to allow each leg links 3 to perform swing motions around two joint axes in the anteroposterior direction and in the horizontal direction.

The degrees of freedom of rotation of the first joint is not limited to "two." For example, the first joint may be adapted to have the degrees of freedom of rotation around three joint axes (three degrees of freedom). Alternatively, the first joint may be adapted to have, for example, only a degree of freedom of rotation around one joint axis (one degree of freedom) in the horizontal direction.

Figure 2:
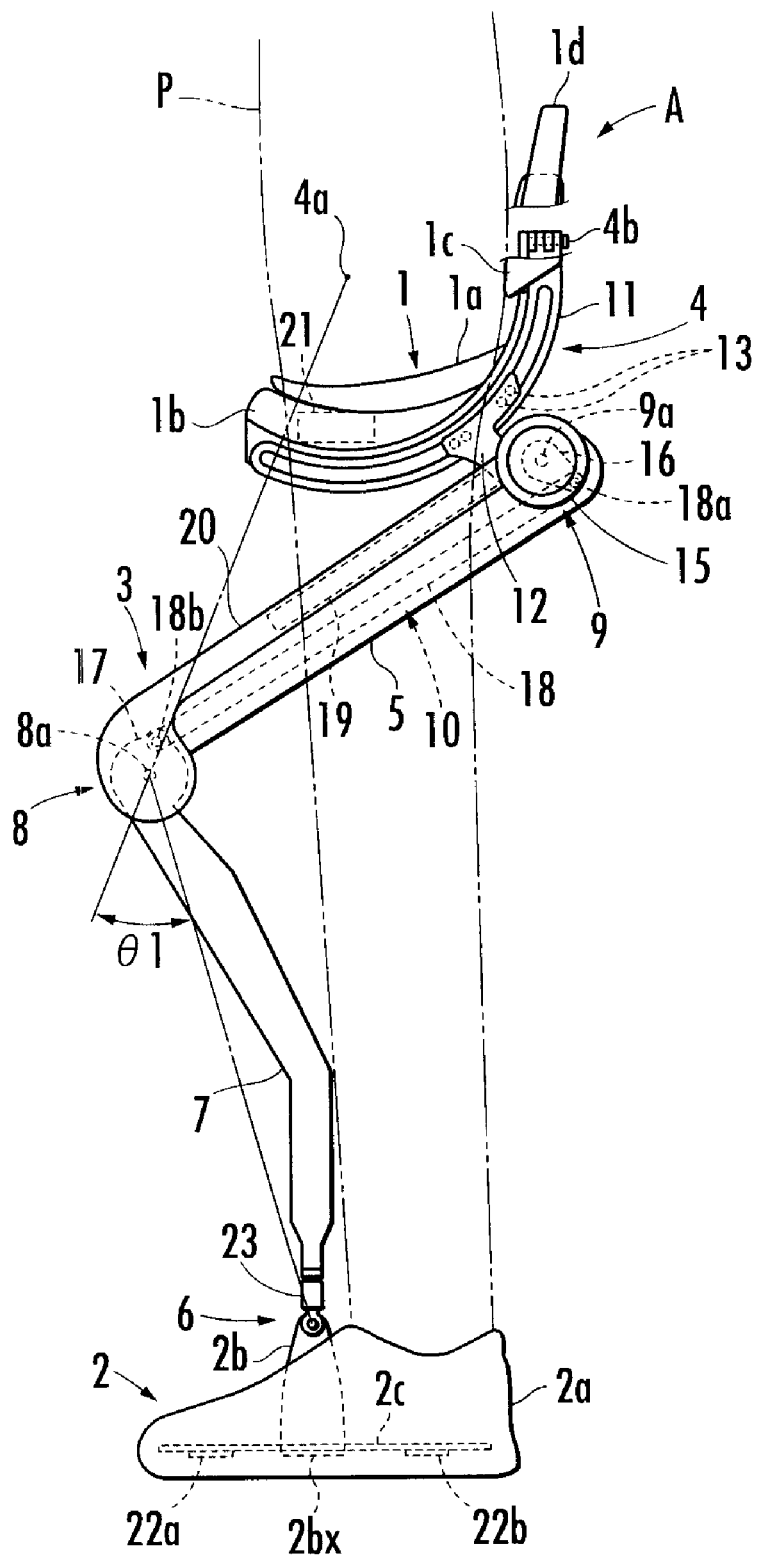
FIG. 2 is a side view of the walking assist device.
Figure 3:
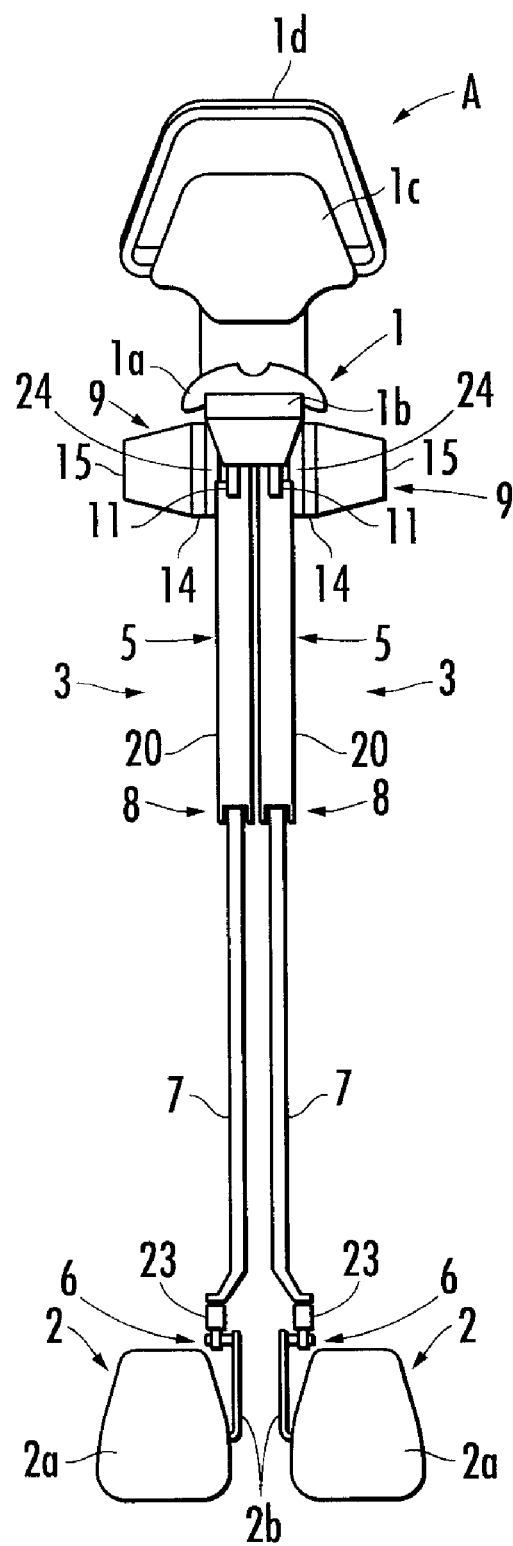
FIG. 3 is a front view of the walking assist device.

Each foot attachment portion 2 includes a shoe 2a fitted to the corresponding foot of the user P and a connecting member 2b projecting upwardly from the inside of the shoe 2a. The foot attachment portion 2 is in contact with the ground via the shoe 2a in a state where the leg of the user P is standing (supporting leg). The connecting member 2b is connected to the bottom end of the crus frame 7 of the leg link 3 via the second joint 6. In this instance, the connecting member 2b is integrally provided with a flat-plate portion 2bx placed on the backside of an insole 2c in the shoe 2a (between the bottom of the shoe 2a and the insole 2c) as shown in FIG. 2. The connecting member 2b including the flat-plate portion 2bx is formed of a relatively highly-rigid member. Thereby, it is possible to apply a part of the floor reaction force (at least a translational force large enough to support the weight of the walking assist device A plus a part of the weight of the user P), which acts on the foot attachment portion 2 from the floor side, to the leg link 3 via the connecting member 2b and the second joint 6 when the foot attachment portion 2 is put in contact with the ground.

The foot attachment portion 2 may include, for example, a slipper-shaped member, instead of the shoe 2a.

In this embodiment, the second joint 6 is formed of a free joint such a ball joint and has three degrees of freedom of rotation around three axes. The second joint, however, may be a joint having, for example, two degrees of freedom of rotation around two axes in the anteroposterior and horizontal directions or two degrees of freedom of rotation around two axes in the vertical and horizontal directions.

The third joint 8 has a degree of freedom of rotation around one axis in the horizontal direction. The third joint 8 has a spindle 8a which pivotally support the top end of the crus frame 7 at the bottom end of the thigh frame 5. The central axis of the spindle 8a is substantially parallel to the first joint axis (an axis perpendicular to the plane including the arc of the guide rail 11) of the first joint 4. The central axis of the spindle 8a serves as the joint axis of the third joint 8. The crus frame 7 is rotatable relative to the thigh frame 5 around the joint axis. This enables the bending and stretching motion of the leg link 3 at the third joint 8.

The actuator 9 provided in each leg link 3 is a rotary actuator formed by an electric motor 15 with a reduction gear 14. The rotary actuator 9 is mounted on the outer surface of the top end (near the first joint 4) of the thigh frame 5 so that the central axis of an output shaft 9a is parallel to the joint axis of the third joint 8 (the central axis of the spindle 8a). A housing (a portion fixed to a stator of the electric motor 15) of the rotary actuator 9 is provided in a fixed manner on the thigh frame 5.

In this embodiment, each power transmission system 10 includes a driving crank arm 16 fixed coaxially with the output shaft 9a of the rotary actuator 9, a driven crank arm 17 fixed to the crus frame 7 coaxially with the joint axis of the third joint 8, and a connecting rod 18 pivotally attached to the driving crank arm 16 and to the driven crank arm 17 at one end and the other end, respectively. The connecting rod 18 linearly extends between a pivotally attached portion 18a to the driving crank arm 16 and a pivotally attached portion 18b to the driven crank arm 17. In the power transmission system 10 having the above structure, the driving force (output torque) output from the output shaft 9a of the rotary actuator 9 by the operation of the electric motor 15 is converted to a translational force in the longitudinal direction of the connecting rod 18 from the output shaft 9a via the driving crank arm 16. Thereafter, the translational force (rod transmitting force) is transmitted through the connecting rod 18 in the longitudinal direction thereof. Further, the translational force is converted to a driving torque from the connecting rod 18 via the driven crank arm 17. Then, the driving torque is applied to the third joint 8 as a driving force for bending and stretching the leg link 3 around the joint axis of the third joint 8.

In this embodiment, the total sum of the lengths of the thigh frame 5 and the crus frame 7 of each leg link 3 is greater than the length of the leg of the user P in a state where the leg is linearly extending. Therefore, the leg links 3 are always flexed at the third joints 8. The flexion angle θ1 (See FIG. 2) ranges, for example, from approx. 40° to 70° during normal walking of the user P on flat ground. The flexion angle θ1 in this specification means an angle between a linear line connecting the third joint 8 and the center of curvature 4a of the guide rail 11 and a linear line connecting the third joint 8 and the second joint 6 (an angle on the acute side), with each leg link 3 viewed in the direction of the joint axis of the third joint 8, as shown in FIG. 2. In this embodiment, a relative positional relation is set among the pivotally attached portions 18a and 18b of the connecting rod 18, the joint axis of the third joint 8, and the output shaft 9a of the rotary actuator 9 in such a way that the driving torque applied to the third joint 8 is greater than the output torque of the rotary actuator 9 in a state where the flexion angle θ1 of each leg link 3 is within a certain angle range (for example, a range of approx. 20° to 70°) including the range of angles observed during normal walking of the user P on flat ground. In this condition, when each leg link 3 is viewed in the direction of the joint axis of the third joint 8 in this embodiment, the linear line between the output shaft 9a of the rotary actuator 9 and the third joint 8 obliquely intersects with the linear line between the pivotally attached portions 18a and 18b of the connecting rod 18 as shown in FIG. 4.

Further, in this embodiment, the position of the pivotally attached portion 18b of the connecting rod 18 is set in such a way that the driving torque applied to the third joint 8 functions as a torque for biasing the leg link 3 in the stretching direction in cases where a tractive force in the longitudinal direction of the connecting rod 18 is applied to the connecting rod 18 by the rotary actuator 9 in a state where the flexion angle θ1 of each leg link 3 is within a certain angle range (for example, a range of approx. 20° to 70°) including the range of angles observed during normal walking of the user P on flat ground. In this case, when the leg link 3 is viewed in the direction of the joint axis of the third joint 8 in this embodiment, the pivotally attached portion 18b of the connecting rod 18 is provided closer to the guide rail 11 than the linear line between the output shaft 9a of the rotary actuator 9 and the third joint 8.

Figure 4:
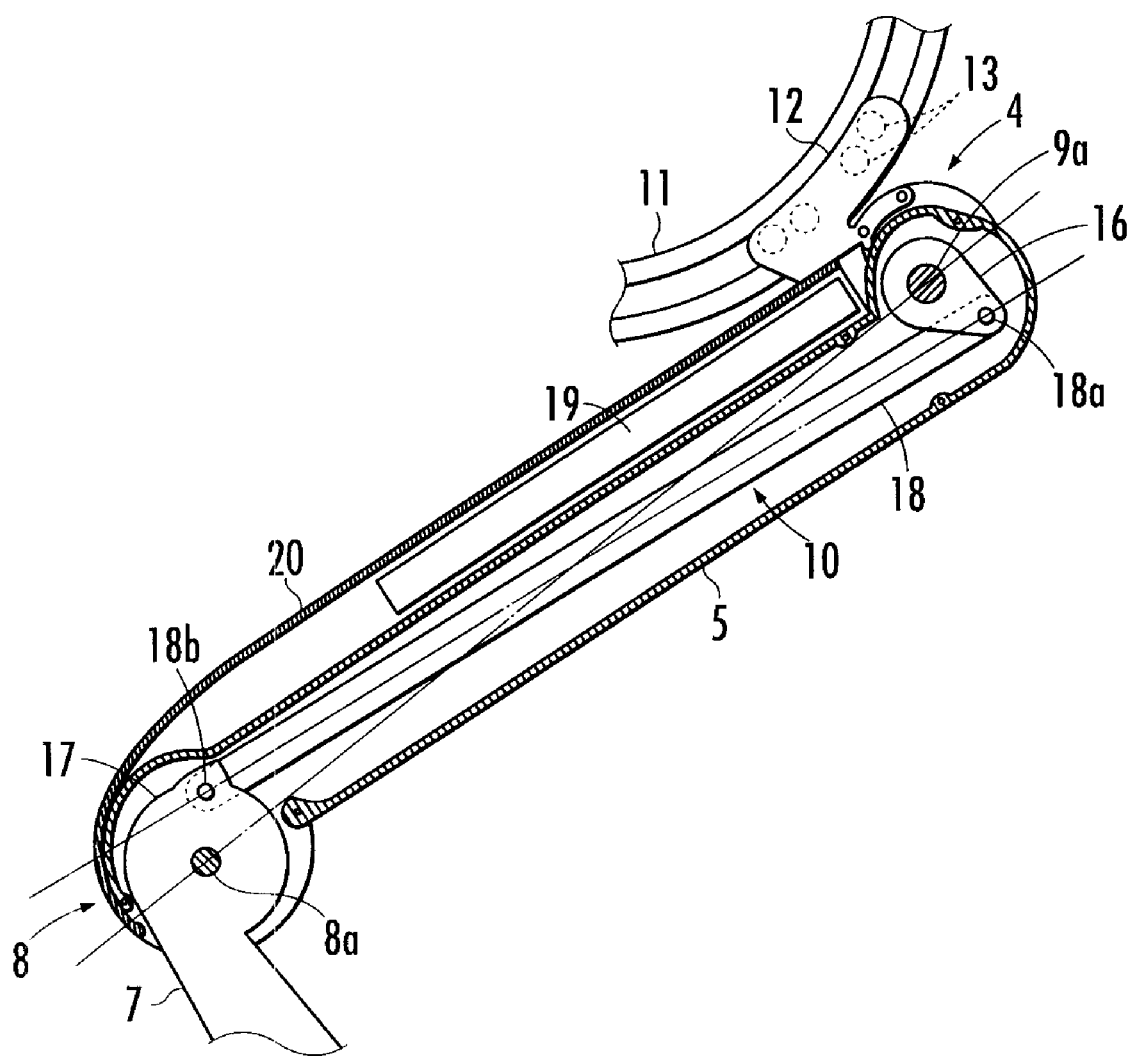
FIG. 4 is a cross-sectional side view of a thigh frame of the walking assist device.

Moreover, as shown in FIG. 4, the thigh frame 5 is provided with a battery 19 placed between the connecting rod 18 and the guide rail 11 and a cover 20 for covering the battery 19. The battery 19 is a power supply for electric devices such as the electric motor 15.

In this embodiment, each power transmission system 10 has been constructed as described above. Alternatively, however, it is possible to mount a pulley, which rotates integrally with the crus frame 7 around the joint axis of the third joint 8, on the third joint 8 to transmit the driving force from the rotary actuator 9 to the pulley via a wire or belt, for example. Further, the rotary actuator 9 may be provided coaxially with the joint axis of the third joint 8 to directly apply the output torque of the rotary actuator 9 to the third joint 8.

The above is the main mechanical configuration of the walking assist device A according to this embodiment. In the walking assist device A having the above structure, the seat member 1 is biased upwardly by applying the driving force (driving torque) in the stretching direction to the third joint 8 of the leg link 3 from the rotary actuator 9 via the power transmission system 10 in a state where the foot attachment portion 2 is in contact with the ground. This causes the upward lifting force to act on the user P from the seat member 1. In the walking assist device A of this embodiment, the lifting force supports a part of the weight of the user P (a part of the gravity acting on the user P) to reduce the load on the leg in walking of the user P.

In this condition, the walking assist device A bears the share of the supporting force for supporting the weight of the walking assist device A and a part of the weight of the user P on the floor of the supporting force for supporting the entire weight of the walking assist device A and the user P on the floor (the total translational force acting on the supporting surface of the walking assist device A from the floor, which is hereinafter referred to as "total supporting force"), and the user P bears the share of the remaining supporting force. Hereinafter, in the above total supporting force, the supporting force as the share of the walking assist device A is referred to as "assist device share supporting force" and the supporting force as the share of the user P is referred to as "user share supporting force." The assist device share supporting force acts on both of the leg links 3 and 3 in a distributed manner in a state where the legs of the user P are standing. In a state where only one leg of the user P is standing, the assist device share supporting force acts only on the standing leg link 3 of the leg links 3 and 3. The same applies to the user share supporting force.

The following describes a structure for controlling the motion of the walking assist device A according to this embodiment. In the walking assist device A of this embodiment, the supporting frame 1b of the seat member 1 houses a controller 21 (control device) for controlling the operation of the electric motor 15 of each rotary actuator 9 as shown in FIG. 2.

Moreover, the walking assist device A has sensors as described below and outputs of the sensors are input to the controller 21. As shown in FIG. 2, the shoe 2a of each foot attachment portion 2 contains a pair of treading force measurement force sensors 22a and 22b for use in measuring the treading force of each leg (a vertical translational force pushing the foot of each leg toward the floor) of the user P. The treading force of each leg is, in other words, a translational force that is balanced with a force acting on each leg (share of each leg) of the user share supporting force. The magnitude of the total sum of the treading forces of the legs is equal to the magnitude of the user share supporting force. In this embodiment, the treading force measurement force sensors 22a and 22b are mounted on the undersurface of the insole 2c in the shoe 2a so as to be opposed to the base of the foot of the user P at two places (front and rear), namely just under the metatarsophalangeal joint (MP joint) and just under the heel of the foot of the user P. These treading force measurement force sensors 22a and 22b are each formed by a one-axis force sensor and generate an output according to the translational force in the direction perpendicular to the base of the shoe 2a.

Moreover, a supporting force measurement force sensor 23 is interposed between the crus frame 7 and the second joint 6 of each leg link 3. The supporting force measurement force sensor 23 is used to measure a supporting force acting on the leg link 3 from the floor side, that is, a share of the leg link 3 of the assist device share supporting force. The supporting force measurement force sensor 23 is a 3-axis force sensor which detects 3-axis translational forces. In this embodiment, however, only detected values of 2-axis translational forces are used among detected 3-axis translational forces as described later. Therefore, the supporting force measurement force sensor 23 may be formed by a 2-axis force sensor which detects 2-axis translational forces.

Moreover, in order to measure the flexion angle of each leg link 3 as an angle representing a displacement angle (a relative rotation angle from a reference position of the crus frame 7 with respect to the thigh frame 5) of the third joint 8 of each leg link 3, an angle sensor 24 (shown in FIG. 3) such as a rotary encoder which generates an output according to the rotation angle (the rotation angle from the reference position) of the output shaft 9a of each rotary actuator 9 is mounted on the thigh frame 5 integrally with the rotary actuator 9. In this embodiment, the flexion angle of the third joint 8 of each leg link 3 is uniquely determined according to the rotation angle of the output shaft 9a of each rotary actuator 9. Therefore, the angle sensor 24 generates an output according to the flexion angle of each leg link 3. The third joint 8 of each leg link 3 corresponds to the knee joint and therefore the flexion angle of each leg link 3 at the third joint 8 is referred to as a knee angle in the following description.

Incidentally, it is possible to mount an angle sensor such as a rotary encoder at the third joint 8 of each leg link 3 so as to directly measure the knee angle of the leg link 3 by means of the angle sensor, instead.

Figure 5:
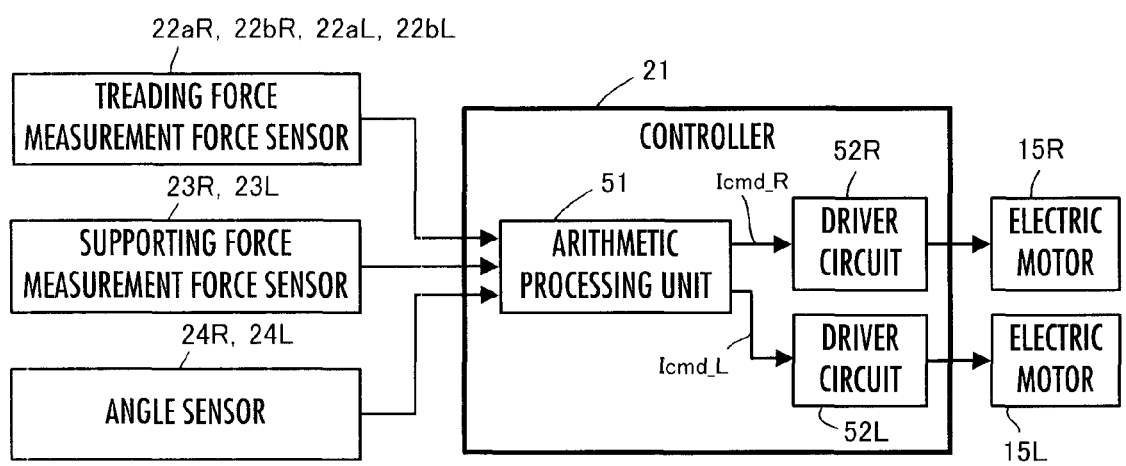
FIG. 5 is a block diagram illustrating the outline of a hardware configuration of a controller provided in the walking assist device of the embodiment.
Figure 6:
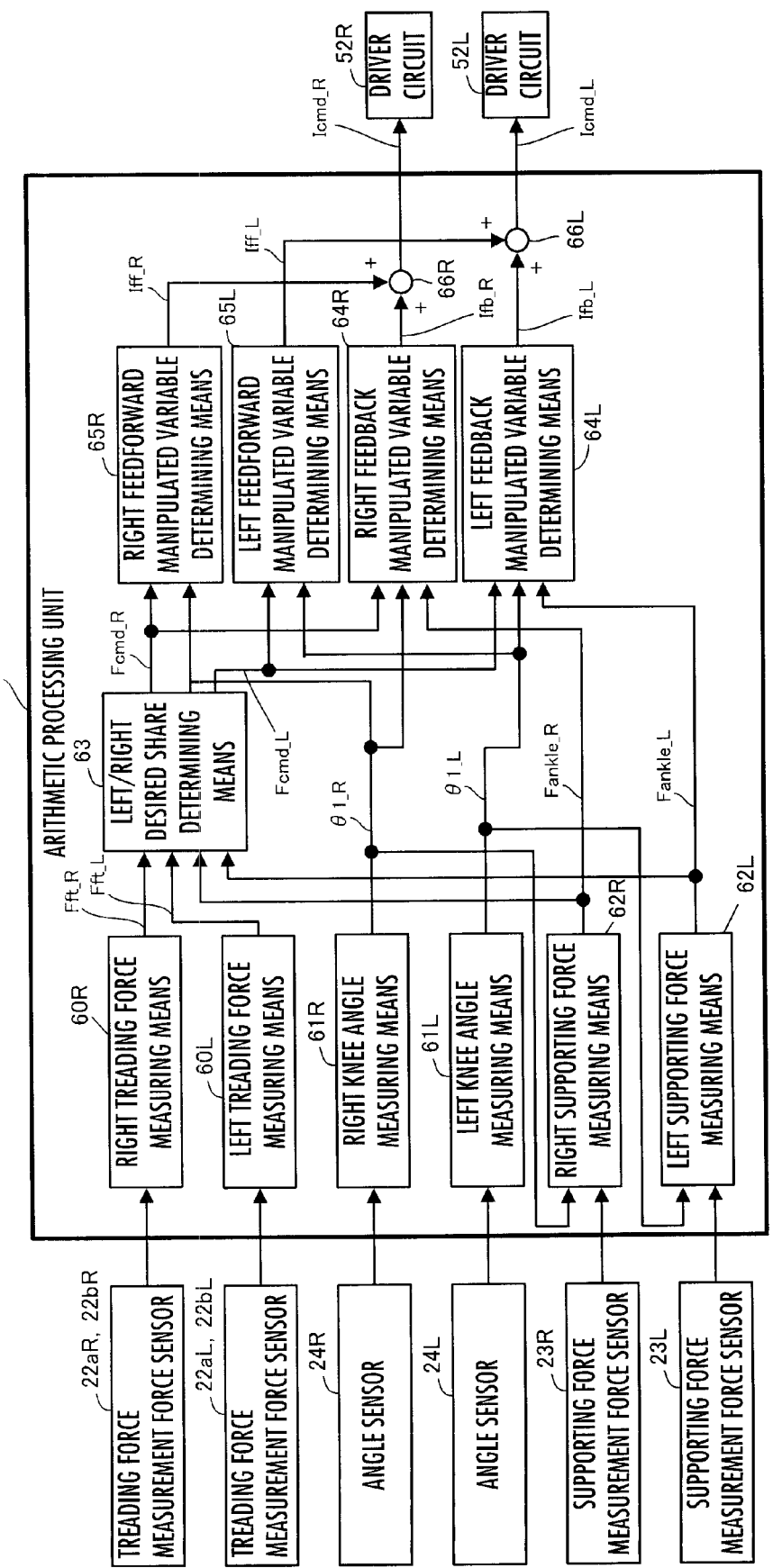
FIG. 6 is a block diagram illustrating a processing function of an arithmetic processing unit of the controller.

The following describes the functions of the controller 21 in more detail with reference to FIGS. 5 and 6. In the following description, a character "R" or "L" may be added to the end of a reference character in order to distinguish between left and right. For example, a term "leg link 3R" is used to indicate the leg link 3 on the right side of the user P in the forward direction and "leg link 3L" is used to indicate the leg link 3 on the left side of the user P. The character "R" and "L" at each end of reference characters are used to indicate elements related to the right leg link 3R or to the left leg link 3L.

As shown in FIG. 5, the controller 21 includes an arithmetic processing unit 51 and driver circuits 52R and 52L which respectively apply electric current to the electric motors 15R and 15L of the rotary actuators 9R and 9L. The arithmetic processing unit 51 is composed of a microcomputer including a CPU, a RAM, and a ROM. The arithmetic processing unit 51 receives outputs of treading force measurement force sensors 22aR, 22bR, 22aL, and 22bL, outputs of supporting force measurement force sensors 23R and 23L, and outputs of angle sensors 24R and 24L via an interface circuit (not shown) composed of an A/D converter or the like. Thereafter, the arithmetic processing unit 51 determines indicator current values Icmd_R and Icmd_L which are indicator values (desired values) of the applied current of the electric motors 15R and 15L by performing desired arithmetic processing by using detection data having been input and previously-stored reference data and program. The arithmetic processing unit 51 then controls the driver circuits 52R and 52L to apply the current of the indicator current values Icmd_R and Icmd_L to the electric motors 15R and 15L, respectively. This controls the output torques of the electric motors 15R and 15L and consequently the output torques of the rotary actuators 9R and 9L.

The arithmetic processing unit 51 has functional means as shown in the block diagram of FIG. 6 in order to determine the above indicator current values Icmd_R and Icmd_L. The functional means are functions implemented by the program mounted on the arithmetic processing unit 51.

As shown in FIG. 6, the arithmetic processing unit 51 includes: a right treading force measuring means 60R which measures a treading force of the right leg of the user P on the basis of the outputs of the right treading force measurement force sensors 22aR and 22bR; a left treading force measuring means 60L which measures a treading force of the left leg of the user P on the basis of the outputs of the left treading force measurement force sensors 22aL and 22bL; a right knee angle measuring means 61R which measures a knee angle of the leg link 3R on the basis of the output of the right angle sensor 24R; a left knee angle measuring means 61L which measures a knee angle of the leg link 3L on the basis of the output of the left angle sensor 24L; a right supporting force measuring means 62R which measures a supporting force acting on the leg link 3R from the floor side on the basis of the output of the right supporting force measurement force sensor 23R and the value (measured value) θ1_R of the knee angle of the leg link 3R measured by the right knee angle measuring means 61R; and a left supporting force measuring means 62L which measures a supporting force acting on the leg link 3L from the floor side on the basis of the output of the left supporting force measurement force sensor 23L and the value (measured value) θ1_L of the knee angle of the leg link 3L measured by the left knee angle measuring means 61L.

Moreover, the arithmetic processing unit 51 includes a left/right desired share determining means 63 which determines desired values Fcmd_R and Fcmd_L of the shares of the leg links 3R and 3L of the assist device share supporting force. The left/right desired share determining means 63 receives inputs of the left and right treading force values (measured values) Fft_R and Fft_L measured by the treading force measuring means 60R and 60L and inputs of the left and right supporting force values (measured values) Fankle_R and Fankle_L measured by the supporting force measuring means 62R and 62L in order to determine the desired values Fcmd_R and Fcmd_L.

In addition, the total sum of the supporting forces which respectively act on the leg links 3R and 3L via the second joints 6R and 6L from the floor side (hereinafter, the total sum is referred to as "total lifting force") is more accurately a supporting force obtained by subtracting the supporting forces for supporting the foot attachment portions 2R and 2L on the floor from the assist device share supporting force. In other words, the total lifting force means an upward translational force for supporting the walking assist device A not including the foot attachment portions 2R and 2L and a part of the weight of the user P. Note that, however, the total weight of the foot attachment portions 2R and 2L is sufficiently low in comparison with the total weight of the walking assist device A and therefore the total lifting force substantially coincides with the assist device share supporting force. In the following description, the shares of the leg links 3R and 3L of the assist device share supporting force are referred to as "total lifting force share." The supporting force measured values Fankle_R and Fankle_L measured by the right and left supporting force measuring means 62R and 62L are measured values of the total lifting force share. In the following description, the desired values Fcmd_R and Fcmd_L of the total lifting force share of the leg links 3R and 3L are referred to as control desired values Fcmd_R and Fcmd_L.

The arithmetic processing unit 51 further includes: a right feedback manipulated variable determining means 64R which receives inputs of the measured value Fancle_R of the total lifting force share of the leg link 3R obtained by the right supporting force measuring means 62R, the control desired value Fcmd_R of the right leg link 3R determined by the left/right desired share determining means 63, and the measured value θ1_R of the knee angle of the leg link 3R obtained by the right knee angle measuring means 61R; a left feedback manipulated variable determining means 64L which receives inputs of the measured value Fankle_L of the total lifting force share of the left leg link 3L obtained by the left supporting force measuring means 62L, the control desired value Fcmd_L of the left leg link 3L determined by the left/right desired share determining means 63, and the measured value θ1_L of the knee angle of the leg link 3L obtained by the left knee angle measuring means 61L; a right feedforward manipulated variable determining means 65R which receives inputs of the control desired value Fcmd_R of the right leg link 3R determined by the left/right desired share determining means 63 and the measured value θ1_R of the knee angle of the leg link 3R obtained by the right knee angle measuring means 61R; and a left feedforward manipulated variable determining means 65L which receives inputs of the control desired value Fcmd_L of the left leg link 3L determined by the left/right desired share determining means 63 and the measured value θ1_L of the knee angle of the leg link 3R obtained by the left knee angle measuring means 61L. The feedback manipulated variable determining means 64 calculates a feedback manipulated variable Ifb (a feedback component of an indicator current value of each electric motor 15) so as to converge a deviation between the measured value Fankle of the total lifting force share and the control desired value Fcmd, which have been entered, to zero. Moreover, each feedforward manipulated variable determining means 65 calculates a feedforward manipulated variable Iff (a feedforward component of an indicator current value of each electric motor 15) for use in causing the supporting force of the control desired value Fcmd to act on each leg link 3 from the floor side according to a feedforward control law (model) from the control desired value Fcmd and the measured value θ1 of the knee angle, which have been entered.

Further, the arithmetic processing unit 51 includes: an addition means 66R, which obtains an indicator current value Icmd_R for the right electric motor 15R by adding the feedback manipulated variable Ifb_R calculated by the right feedback manipulated variable determining means 64R and the feedforward manipulated variable Iff_R calculated by the right feedforward manipulated variable determining means 65R (correcting the feedforward manipulated variable by the feedback manipulated variable); and an addition means 66L which obtains an indicator current value Icmd_L for the left electric motor 15L by adding the feedback manipulated variable Ifb_L calculated by the left feedback manipulated variable determining means 64L and the feedforward manipulated variable Iff_L calculated by the left feedforward manipulated variable determining means 65L (correcting the feedforward manipulated variable by the feedback manipulated variable).

The following describes the details of the processing of the arithmetic processing unit 51. The controller 21 is turned on in a state where the user P wears the foot attachment portions 2 on the feet with the seat member 1 placed under the crotch of the user P. In this condition, the arithmetic processing unit 51 performs processing described below at predetermined control processing cycles.

In each control processing cycle, the arithmetic processing unit 51 first performs processing of the treading force measuring means 60R and 60L, processing of the knee angle measuring means 61R and 61L, and processing of supporting force measuring means 62R and 62L.

The processing of the treading force measuring means 60R and 60L is performed as described below. The algorithm of the processing is the same in either of the treading force measuring means 60R and 60L. Therefore, the processing of the right treading force measuring means 60R will be typically described below.

The right treading force measuring means 60R obtains a measured value Fft_R of the treading force of the right leg of the user P by adding up the force detected values indicated by the outputs of the treading force measurement force sensors 22a and 22bR, respectively (more specifically, force detected values obtained after low-pass filtering to remove noise components). The same applies to the processing of the left treading force measuring means 60L.

The processing of the treading force measuring means 60 may additionally include limit processing for forcibly setting the measured value Fft of the treading force to "0" in cases where the total sum of the force detected values of the treading force measurement force sensors 22a and 22b corresponding to the respective treading force measuring means 60R and 60L is a very small value less than a predetermined lower limit. Alternatively, it is possible to add limit processing for forcibly setting the measured value Fft of the treading force to a predetermined upper limit in cases where the total sum exceeds the upper limit. In this embodiment, as described later, the proportion between the respective control desired values Fcmd_R and Fcmd_L of the leg links 3R and 3L is basically determined according to the proportion between the measured value Fft_R of the treading force of the right leg of the user P and the measured value Fft_L of the treading force of the left leg of the user P. Therefore, it is effective to add the limit processing to the processing of the treading force measuring means 60 in order to prevent frequent changes in proportion between the control desired values Fcmd_R and Fcmd_L.

Additionally, the treading force measuring means of the present invention is implemented by the treading force measuring means 60R and 60L described above in this embodiment.

Moreover, the processing of the knee angle measuring means 61R and 61L is performed as described below. The algorithm is the same in either of the knee angle measuring means 61R and 61L. Therefore, the processing of the right knee angle measuring means 61R is typically described below. The right knee angle measuring means 61R obtains a provisional measurement value of the knee angle of the leg link 3R from a rotation angle of the output shaft 9*a*R of the rotary actuator 9R indicated by an output of the angle sensor 24R on the basis of a preset arithmetic expression or data table (an arithmetic expression or a data table representing a relationship between the rotation angle and the knee angle of the leg link 3R). The right knee angle measuring means 61R then obtains a measured value $\theta 1\_R$ of the knee angle of the leg link 3R by performing low-pass filtering on the provisional measurement value to remove noise components. The same applies to the processing of the left knee angle measuring means 61L.

Specifically, the knee angle measured by the knee angle measuring means 61 is the angle $\theta 1$ shown in FIG. 2, though the knee angle may be a supplementary angle of the angle $\theta 1$ (=180°−$\theta 1$), instead. Alternatively, for example, when viewed in the joint axis direction of the third joint 8 of each leg link 3, the knee angle may be defined as an angle between the longitudinal direction of the thigh frame 5 of each leg link 3 and a linear line connecting the third joint 8 to the second joint 6 of the leg link 3. In the following description, the knee angle measured by the knee angle measuring means 61 is assumed to be the angle $\theta 1$ shown in FIG. 2.

Figure 7:
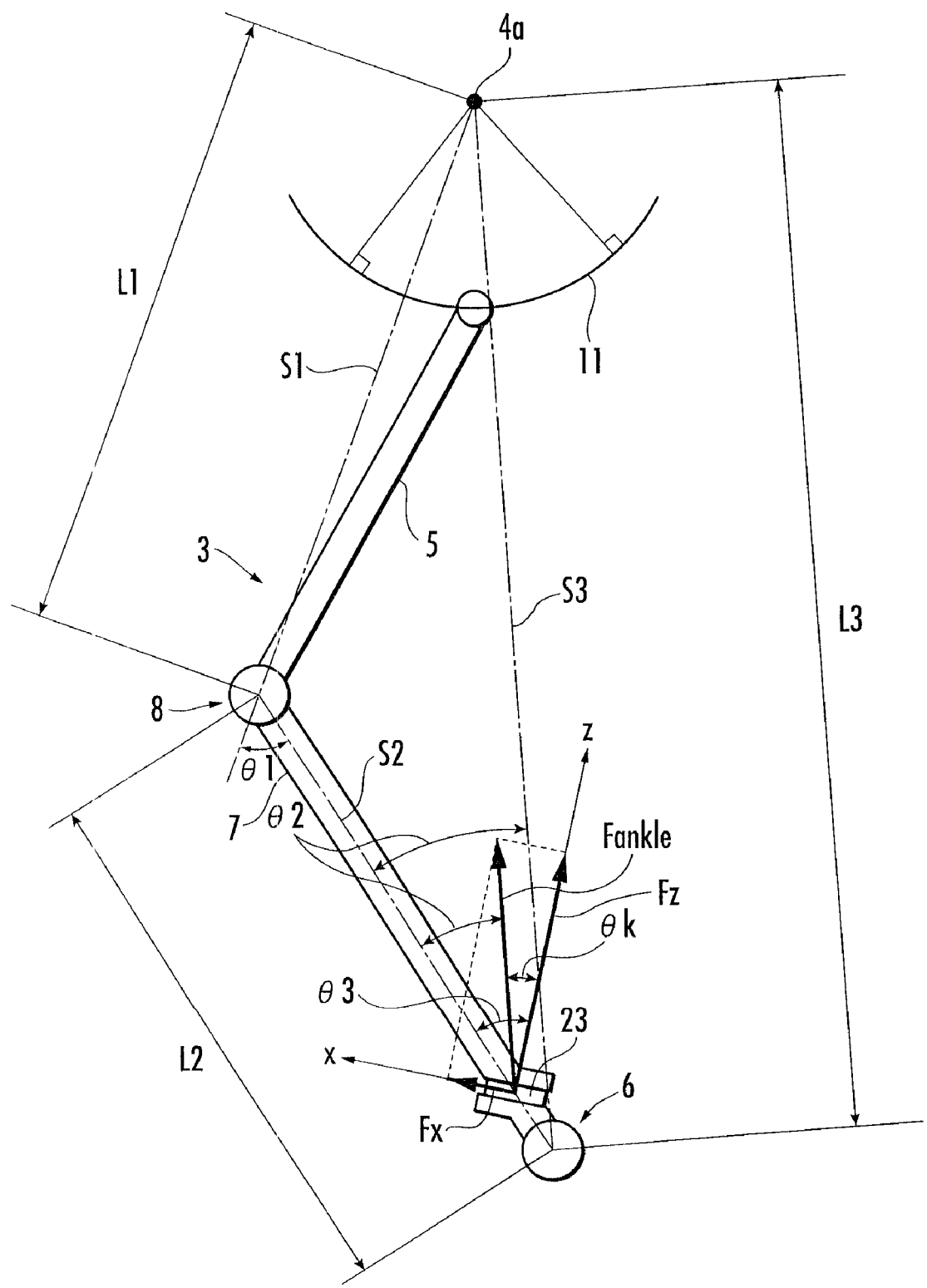
FIG. 7 is a diagram illustrating processing of a supporting force measuring means shown in FIG. 6.

The processing of the supporting force measuring means 62R and 62L is performed as described below after the execution of the processing of the knee angle measuring means 61R and 61L corresponding to the supporting force measuring means 62R and 62L, respectively. The algorithm of the processing is the same in either of the supporting force measuring means 62R and 62L. Therefore, the following typically describes the processing of the right supporting force measuring means 62R with reference to FIG. 7. FIG. 7 illustrates the construction of the essential part of the leg link 3. Although the characters "R" and "L" at each end of the reference characters are omitted in the following description of the right supporting force measuring means 62R, the reference characters are assumed to relate to the right leg link 3R (the character "R" is assumed to be omitted) unless otherwise specified herein.

Referring to FIG. 7, "Fankle" is the supporting force (the supporting force acting on the supporting force measurement force sensor 23) acting on the leg link 3 from the floor side via the second joint 6, that is, the total lifting force share of the leg link 3, and "S3" is a line segment connecting the center of curvature 4*a* of the guide rail 11 and the second joint 6. In this condition, the total lifting force share Fankle is a translational force in a direction substantially parallel to the line segment S3.

On the other hand, the supporting force measurement force sensor 23 detects, as shown, a force Fz in the z-axis direction perpendicular to the surface of the force sensor 23 (the upper surface or the lower surface) and a force Fx in the x-axis direction perpendicular to the z-axis direction and parallel to the surface of the force sensor 23. The x axis and the z axis are coordinate axes fixed to the force sensor 23 and are parallel to the surface including the arc of the guide rail 11. In this condition, the detected forces Fz and Fx are z-axis and x-axis direction components of Fankle, respectively. Therefore, where $\theta k$ is an angle between Fankle and the z axis as shown, Fankle is calculated from the detected values of the forces Fz and Fx and the angle $\theta k$ by the following equation (1):

$$Fankle = Fx \cdot \sin \theta k + Fz \cdot \cos \theta k \qquad (1)$$

The angle $\theta k$ is obtained as described below. Specifically, it is assumed that S1 is a line segment connecting the center of curvature 4*a* of the guide rail 11R and the third joint 8, S2 is a line segment connecting the third joint 8 and the second joint 6, and $\theta 2$ is an angel between the line segment S2 and the line segment S3 (an acute angle). In this condition, the lengths L1 and L2 of the line segments S1 and S2 in the triangle having three sides of the line segments S1, S2, and S3 have constant values (predetermined known values). Moreover, the angle $\theta 1$ (acute angle) between the line segments S1 and S2 is a knee angle measured by the knee angle measuring means 61. Therefore, the angle $\theta 2$ is obtained from the lengths L1 and L2 of the line segments S1 and S2 (these values are previously stored in the memory) and the measured value $\theta 1$ of the knee angle by a geometric calculation.

More specifically, in the triangle having three sides of the line segments S1, S2, and S3, the following relational expressions (2) and (3) are satisfied:

$$L3^2 = L1^2 + L2^2 - 2 \cdot L1 \cdot L2 \cdot \cos(180° - \theta 1) \qquad (2)$$

$$L1^2 = L2^2 + L3^2 - 2 \cdot L2 \cdot L3 \cdot \cos \theta 2 \qquad (3)$$

where L3 is the length of the line segment S3.

Therefore, the length L3 is calculated from the values of the lengths L1 and L2 and the measured value $\theta 1$ of the knee angle by equation (2). Further, the angle $\theta 2$ is calculated from the calculated value of the length L3 and the values of the lengths L1 and L2 by equation (3).

Further, assuming that $\theta 3$ is an angle between the z axis and the line segment S2, the angle $\theta 3$ is a constant value (fixed value) that is previously determined according to the angle at which the supporting force measurement force sensor 23 is mounted on the crus frame 7. The value of the angle $\theta k$ required for the calculation of equation (1) is obtained by subtracting the angle $\theta 2$ calculated as described above from the angle $\theta 3$ of the constant value (the value is previously stored in a memory which is not shown). Since the angle $\theta k$ eventually becomes a function value of the knee angle, mapping may be previously designed for the relationship between the knee angle and the angle $\theta k$. In this case, the angle $\theta k$ is obtained on the basis of the mapping from the measured value $\theta 1$ of the knee angle.

In the processing of the right supporting force measuring means 62 according to this embodiment, the measured value Fankle of the total lifting force share of the right leg link 3 is calculated by equation (1) from the angle $\theta k$ calculated as described above and the detected values Fx and Fz of the supporting force measurement force sensor 23.

The details of the processing of the right supporting force measuring means 62R have been described hereinabove. The same applies to the left supporting force measuring means 62L.

In this embodiment, the measured value Fankle is obtained as the measured value of the total lifting force share of each leg link 3 by equation (1). Alternatively, however, the measured value Fankle may be obtained by calculating a square root of the sum of a square value of the detected value Fx of the force in the x-axis direction and a square value of the detected value Fz of the force in the z-axis direction, where the values Fx and Fz are detected by the supporting force measurement force sensor 23. In this case, the measured value θ1 of the knee angle is unnecessary to obtain the measured value Fankle. Moreover, the measured value Fankle of the total lifting force share may be, for example, a value obtained by dividing the detected value Fx by sin θk or a value obtained by dividing the detected value Fz by cos θk. In this case, the supporting force measurement force sensor 23 may be a 1-axis force sensor.

Additionally, the supporting force measuring means of the present invention is implemented by the supporting force measuring means 62R and 61L described above in this embodiment.

Subsequently, the arithmetic processing unit 51 performs the processing of the left/right desired share determining means 63. This processing will be described in detail below with reference to FIG. 8.

The arithmetic processing unit 51 first performs the processing of steps S101 to S108. This processing determines a right distribution ratio which is the ratio of the control desired value of the right leg link 3R to the desired value of the total lifting force (approximately equal to the assist device share supporting force) and a left distribution ratio which is the ratio of the control desired value of the left leg link 3L to the desired value of the total lifting force. The total sum of the right distribution ratio and the left distribution ratio is 1. The right distribution ratio and the left distribution ratio correspond to the predetermined ratio of the present invention.

In step S101, the left/right desired share determining means 63 calculates the total sum Fft_all (=Fft_R+Fft_L) of the measured value Fft_R of the treading force of the right leg and the measured value Fft_L of the treading force of the left leg obtained by the treading force measuring means 60R and 60L, respectively. Next, in step S102, the left/right desired share determining means 63 determines whether the total sum Fft_all is larger than a predetermined small value (for example, 3[N]) which is close to zero.

If the total sum Fft_all is larger than the predetermined value (if the determination result is affirmative in step S102), the left/right desired share determining means 63 sets the value Fft_R/Fft_all obtained by dividing the measured value Fft_R of the treading force of the right leg by the total sum Fft_all as a provisional value of the right distribution ratio in step S103.

On the other hand, if the total sum Fft_all is equal to or smaller than the predetermined value (if the determination result is negative in step S102), determination is made in step S104 as to the magnitude relation between the current values (the latest values obtained in the current control processing cycle) of the measured values Fankle_R and Fankle_L of the total lifting force share calculated by the supporting force measuring means 62R and 62L. More specifically, it is determined whether the value Fankle is larger than the value Fankle_L in step S104. Alternatively, the previous values (the values obtained in the previous control processing cycle) may be used instead of the current values of Fankle_R and Fankle_L. Preferably, the measured values Fankle_R and Fankle_L of the total lifting force share compared with each other in step S104 are those measured immediately before the negative determination result is obtained in step S102.

If Fankle_R>Fankle_L in the determination of step S104 (if the determination result is affirmative in step S104), the provisional value of the right distribution ratio is set to 1 in step S105. Moreover, if Fankle_R≦Fankle_L (if the determination result is negative in step S104), the provisional value of the right distribution ratio is set to zero in step S106.

After setting the provisional value of the right distribution ratio in step S103, S105, or S106 as described above, the right distribution ratio (the right distribution ratio in the current control processing cycle) is finally determined by performing low-pass filtering on the provisional value in step S107. Thereafter, in step S108, the left distribution ratio is determined by subtracting the right distribution ratio determined as described above from "1." The filtering processing of step S107 is provided to prevent a sudden change in the right distribution ratio (consequently, a sudden change in the left distribution ratio).

In addition, alternatively the provisional value of the left distribution ratio may be determined, instead of determining the provisional value of the right distribution ratio in step S103, S105, or S106. Thereafter, the low-pass filtering may be performed on the provisional value and the value obtained thereby may be determined as the left distribution ratio. Further, the right distribution ratio may be determined by subtracting the left distribution ratio determined in this manner from "1." In this case, in step S103, the value Fft_L/Fft_all obtained by dividing the measured value Fft_L of the treading force of the left leg by the total sum Fft_all is determined as a provisional value of the left distribution ratio. Then, in steps S105 and S106, values "0" and "1" can be set to the provisional value of the left distribution ratio, respectively.

After the determination of the right distribution ratio and the left distribution ratio as described above, the left/right desired share determining means 63 determines the control desired value Fcmd_R which is the desired value of the total lifting force share of the right leg link 3R and the control desired value Fcmd_L which is the desired value of the total lifting force of the left leg link 3L by multiplying the desired value of the total lifting force by the right distribution ratio and the left distribution ratio, respectively, in the next step S109.

The desired value of the total lifting force is previously set as described below in this embodiment and stored in a memory which is not shown. For example, the desired value of the total lifting force is set by obtaining the magnitude of the gravity (the weight×gravitational acceleration) acting on the weight of the entire weight of the walking assist device A (or the weight obtained by subtracting the total weight of the foot attachment portions 2 and 2 from the entire weight) plus a part of the weight of the user P to be supported by the lifting force acting on the user P from the seat member 1 (for example, the weight obtained by multiplying the entire weight of the user P by a preset ratio) and then setting the magnitude of the gravity as the desired value of the total lifting force. In this case, the upward translational force having the magnitude equivalent to the gravity acting on a part of the weight of the user P is set as the desired lifting force applied to the user P from the seat member 1.

Alternatively, the magnitude of the desired lifting force applied to the user P from the seat member 1 may be directly settable for the arithmetic processing unit 51. In addition, the arithmetic processing unit 51 may calculate the total sum of the desired lifting force and the magnitude of the gravity acting on the entire weight of the walking assist device A (or the weight of the entire weight minus the total weight of the foot attachment portions 2 and 2), as a desired value of the total lifting force. Moreover, if a vertical inertial force generated by the motion of the walking assist device A is relatively large in comparison with the above gravity, the magnitude of the total sum of the inertial force and the foregoing gravity may be set as a desired value of the total lifting force. In this instance, the inertial force needs to be estimated sequentially. The estimation can be performed by a method described in Patent Document 2, for example.

The above is the processing of the left/right desired share determining means 63. Note here that one of the foot attachment portions 2R and 2L is normally in contact with the floor in normal walking of the user P. Therefore, normally the total sum Fft_all of the measured values of the treading forces of the left and right legs calculated in step S101 is almost the same as the magnitude of the gravity equivalent to the weight obtained by subtracting the weight supported by the walking assist device A from the weight of the user P. The predetermined value compared with the total sum Fft_all in step S102 is set so as to be sufficiently smaller than the normal level of the total sum Fft_all. Therefore, normally the determination result is affirmative in step S102. In this instance, the left/right desired share determining means 63 determines the right control desired value Fcmd_R and the left control desired value Fcmd_L so that the proportion (ratio) between the control desired values coincides with the ratio between the right distribution ratio and the left distribution ratio (the ratio between Fft_R and Fft_L) determined according to the measured value Fft_R of the treading force of the right leg of the user P and the measured value Fft_L of the treading force of the left leg of the user P.

On the other hand, as described above, in the state during the period between the time points immediately before and immediately after the start of the two-leg supporting period in walking of the user P, the treading force measurement force sensors 22a and 22b for the leg whose actual treading force is large (hereinafter, sometimes referred to as the second leg) do not respond to the treading force of the second leg almost at all in some cases, as well as the leg (hereinafter, sometimes referred to as the first leg) whose actual treading force is sufficiently small or zero. In such a case, the measured value Fft_R of the treading force of the right leg and the measured value Fft_L of the treading force of the left leg are both zero or very small, through the actual treading force of the second leg is sufficiently larger than the actual treading force of the first leg. Further, the determination result is negative in step S102.

In this case, if the first leg and the second leg are the right leg and the left leg, respectively, a large part of the assist device share supporting force acts on the left leg link 3L. Therefore, the measured value Fankle_L of the total lifting force share on the left side is greater than the measured value Fankle_R of the total lifting force share on the right side. On this account, the determination result is negative in step S104. Consequently, the right distribution ratio and the left distribution ratio are set to "0" and "1," respectively. In other words, these distribution ratios are set so that the right distribution ratio is smaller than the left distribution ratio so as to be consistent with the relation, Fankle_R<Fankle_L.

Moreover, if the first leg and the second leg are the left leg and the right leg, respectively, a large part of the assist device share supporting force acts on the right leg link 3R. Therefore, the measured value Fankle_R of the total lifting force share on the right side is greater than the measured value Fankle_L of the total lifting force share on the left side. On this account, the determination result is affirmative in step S104. Consequently, the right distribution ratio and the left distribution ratio are set to "1" and "0," respectively. In other words, these distribution ratios are set so that the right distribution ratio is greater than the left distribution ratio so as to be consistent with the relation, Fankle_R>Fankle_L.

Therefore, even if the measured value Fft_R of the treading force of the right leg and the measured value Fft_L of the treading force of the left leg are both zero or very small (even if the determination result is negative in step S102) in the state during the period between the time points immediately before and immediately after the start of the two-leg supporting period in walking of the user P, the left/right desired share determining means 63 is able to determine the control desired value Fcmd_R on the right side and the control desired value Fcmd_L on the left side so that the proportion (ratio) between the control desired values does not greatly deviate from the ratio between the actual treading force of the right leg and the actual treading force of the left leg of the user P.

In addition, the left/right desired share determining means 63 described above includes the functions of the treading force total sum decision means, the predetermined ratio determining means, and the supporting force desired value setting means of the present invention. In other words, the treading force total sum decision means is implemented by the decision process of step S102. Moreover, the predetermined ratio determining means is implemented by the processes of steps S103 to S108. In this case, the total lifting force share which is the supporting force acting on each leg link 3 from the floor side is used, in this embodiment, as the reference parameter of the present invention. If the determination result is negative in step S102, the right distribution ratio and the left distribution ratio are determined according to the measured values Fankle_R and Fankle_L of the reference parameters obtained immediately before the negative determination. Moreover, the supporting force desired value determining means is implemented by the process of step S109.

After performing the processing of the left/right desired share determining means 63 as described above, the arithmetic processing unit 51 performs the processing of the feedback manipulated variable determining means 64R and 64L and of the feedforward manipulated variable determining means 65R and 65L sequentially or in parallel. The algorithm of the processing is the same in either of the feedback manipulated variable determining means 64R and 64L. Further, the algorithm of the processing is the same in either of the feedforward manipulated variable determining means 65R and 65L. The following typically describes the processing of the right feedback manipulated variable determining means 64R and the processing of the right feedforward manipulated variable determining means 65R. In the description of the processing of the right feedback manipulated variable determining means 64R and the processing of the right feedforward manipulated variable determining means 65R, the reference characters are assumed to relate to the right leg link 3R (the character "R" is assumed to be omitted) unless otherwise specified herein, similarly to the description of the processing of the supporting force measuring means 62.

In the processing of the right feedback manipulated variable determining means 64, a feedback manipulated variable Ifb is calculated as a feedback component of the indicator current value Icmd of the electric motor 15 according to a predetermined feedback control law such as, for example, a proportional-derivative (PD) law from a deviation $\Delta F$ (=Fcmd−Fankle) between the control desired value Fcmd of the right leg link 3 determined by the left/right desired share determining means 63 and the measured value Fankle of the total lifting force share of the right leg link 3 obtained by the right supporting force measuring means 62. Specifically, the feedback manipulated variable Ifb is calculated by adding up a value obtained by multiplying the deviation $\Delta F$ by a predetermined gain Kp (proportional term) and a derivative of multiplication between the deviation $\Delta F$ and a predetermined gain Kd (derivative term). In this embodiment, the sensitivity to change of the lifting force of the seat member 1 in response to change in electric current of the electric motor 15 (change in the output torque) varies according to the knee angle of the leg link 3. Therefore, in this embodiment, the right feedback manipulated variable determining means 64 variably sets the values of the gains Kp and Kd of the proportional term and the derivative term described above according to the measured value θ1 of the knee angle of the leg link 3 based on a predetermined data table which is not shown (a data table representing a relationship between the knee angle and the gains Kp and Kd).

The processing of the right feedback manipulated variable determining means 64R has been described hereinabove. The processing of the left feedback manipulated variable determining means 64L is performed in the same manner. The feedback control law used by each feedback manipulated variable determining means 64 may be a control law other than the PD law (such as PID law).

The right feedforward manipulated variable determining means 65 calculates a feedforward manipulated variable Iff as a feedforward component of the indicator current value of the electric motor 15 by the following model equation (4):

$$Iff = B1 \cdot Tcmd + B2 \cdot \omega 1 + B3 \cdot sgn(\omega 1) + B4 \cdot \beta 1 \quad (4)$$

where Tcmd in the right-hand side of equation (4) is a desired value of a driving torque (hereinafter, referred to as "desired joint torque Tcmd) applied to the third joint 8 of the right leg link 3 by the driving force of the rotary actuator 9, ω1 is a knee angular velocity as a time rate of change (derivative) of the knee angle of the right leg link 3, β1 is a knee angular acceleration as a time rate of change (derivative) of the knee angular velocity ω1, and sgn ( ) is a sign function. Characters B1, B2, B3, and B4 are coefficients of predetermined values.

The first term in the right-hand side of equation (4) represents a basic requested value of an applied current of the electric motor 15, which is requested to provide the third joint 8 of the right leg link 3 with a driving torque of the desired joint torque Tcmd. Further, the second term in the right-hand side represents a component of applied current of the electric motor 15, which is requested to drive the third joint 8 against a viscous resistance between the thigh frame 5 and the crus frame 7 at the third joint 8 of the right leg link 3, that is, a viscous resistance force between the thigh frame 5 and the crus frame 7 generated according to the knee angular velocity ω1. The third term in the right-hand side represents a component of applied current of the electric motor 15, which is requested to drive the third joint 8 against a dynamic frictional force between the thigh frame 5 and the crus frame 7 at the third joint 8 of the right leg link 3. Moreover, the fourth term in the right-hand side represents a component of applied current of the electric motor 15, which is requested to drive the third joint 8 against an inertial force moment generated according to the knee angular acceleration β1.

In this case, the right feedforward manipulated variable determining means 65 calculates the knee angular velocity ω1 and the knee angular acceleration β1 required for calculation of the right-hand side of equation (4) from the time series of the measured value θ1 of the knee angle of the right leg link 3 obtained by the right knee angle measuring means 61. Further, the right feedforward manipulated variable determining means 65 calculates the desired joint torque Tcmd required for calculation of the right-hand side of equation (4) as described below.

Specifically, the right feedforward manipulated variable determining means 65 calculates the desired joint torque Tcmd from the angle θ2 calculated, based on equations (2) and (3), from the measured value θ1 of the knee angle of the right leg link 3 obtained by the right knee angle measuring means 61 (the angle between the line segment S2 and the line segment S3 in FIG. 7) and from the control desired value Fcmd of the right leg link 3 determined by the left/right desired share determining means 63 by the following equation (5):

$$Tcmd = (Fcmd \cdot \sin \theta 2) \cdot L2 \quad (5)$$

where the right-hand side of equation (5) represents a moment acting on the third joint 8 of the right leg link 3 by a supporting force in the case of applying the supporting force having the magnitude of the control desired value Fcmd to the right leg link 3 via the second joint 6 from the floor side. A driving torque balanced with the moment is calculated as the desired joint torque Tcmd.

In the processing of the right feedforward manipulated variable determining means 65, the right-hand side of equation (4) is calculated by using the values of the knee angular velocity ω1, the knee angular acceleration β1, and the desired joint torque Tcmd calculated as described above and thereby the feedforward manipulated variable Iff is calculated.

In addition, the values of the coefficients B1, B2, B3, and B4 used for the calculation of equation (4) are previously identified on an experimental basis by an identification algorithm for minimizing a square value of a difference between the value of the left-hand side (actual measurement) and the value of the right-hand side (calculated value) of equation (4) and then stored in a memory which is not shown. Further, the feedforward manipulated variable Iff may be determined by using a model equation in which any one is omitted from the terms of the right-hand side of equation (4).

The processing of the right feedforward manipulated variable determining means 65R has been described in detail hereinabove. The processing of the left feedforward manipulated variable determining means 65L is performed in the same manner.

Referring to FIG. 6, after calculating the manipulated variables Ifb_R and Iff_R of the electric current of the electric motor 15R and the manipulated variables Ifb_L and Iff_L of the electric current of the electric motor 15L as described above, the arithmetic processing unit 51 adds the manipulated variables Ifb_R and Iff_R by using the addition means 66R. Thereby, the arithmetic processing unit 51 determines the indicator current value Icmd_R of the electric motor 15R. In addition, the arithmetic processing unit 51 adds the manipulated variables Ifb_L and Iff_L by using the addition means 66L. Thereby, the arithmetic processing unit 51 determines the indicator current value Icmd_L of the electric motor 15L. Thereafter, the arithmetic processing unit 51 outputs these indicator current values Icmd_R and Icmd_L to the driver circuits 52R and 52L respectively corresponding to the electric motors 15R and 15L. Each driver circuit 52 then applies power to the corresponding electric motor 15 according to the given indicator current value Icmd.

In addition, the actuator control means of the present invention is implemented by the left/right desired share determining means 63, the feedback manipulated variable determining means 64R and 64L, and the feedforward manipulated variable determining means 65R and 65L, and the addition means 66R and 66L in this embodiment.

The control processing of the arithmetic processing unit 51 described above is performed at predetermined control processing cycles. This causes the feedback control of the output torque of each electric motor 15 and consequently the driving torque applied to the third joint 8 of each leg link 3 so that the measured value Fankle of the total lifting force share of each leg link 3 coincides with (is converged to) the control desired value Fcmd corresponding to the leg link 3. As a result, the translational force capable of supporting a part of the weight of the user P acts on the user P from the seat member 1, which thereby reduces the load on the legs of the user P.

In this case, if the determination result is negative in step S102 of FIG. 8, the right distribution ratio and the left distribution ratio are determined as described above according to the measured values Fankle_R and Fankle_L of the total lifting force share as reference parameters. Therefore, it is possible to prevent the right distribution ratio and the left distribution ratio from greatly deviating from the proportion (ratio) between the treading forces of the legs of the user P or to prevent a sudden change in each of the distribution ratios even in the situation, if occurs, where the measured value of the treading force of the second leg cannot be appropriately obtained (in a situation where the measured value is zero or very small) during a shift from the one-leg supporting period to the two-leg supporting period.

The following describes some variations of this embodiment.

In the above embodiment, the measured value Fankle of the total lifting force share is used as the value of the reference parameter in the present invention. Note that, however, the value of the reference parameter is not limited to the measured value Fankle of the total lifting force share. For example, each electric motor 15 is controlled so that the measured value Fankle of the total lifting force share follows the control desired value Fcmd corresponding to the measured value Fankle. Therefore, for example, the control desired value Fcmd may be used as the value of the reference parameter to determine the right distribution ratio and the left distribution ratio, instead of the measured value Fankle of the total lifting force share. In this instance, in step S104 of FIG. 8, a comparison may be made between the control desired values Fcmd_R and Fcmd_L of the leg links 3R and 3L, which have been obtained immediately before the negative determination result of step S102 (for example, in the previous control processing cycle of the arithmetic processing unit 51).

Moreover, during the shift from the one-leg supporting period to the two-leg supporting period (during the period between the time points immediately before and immediately after the start of the two-leg supporting period), the driving torque (the driving torque in the stretching direction of the leg link 3) applied to the third joint 8 of the leg link 3 on the standing leg (the second leg) side in the one-supporting leg period from the rotary actuator 9 is larger than the driving torque (the driving torque in the stretching direction of the leg link 3) applied to the third joint 8 of the leg link 3 on the other leg (the first leg) side from the rotary actuator 9. Therefore, for example, the desired joint torque Tcmd (the desired value of the driving torque of the third joint 8) calculated by equation (5) may be used as the value of the reference parameter. In this instance, in step S104 of FIG. 8, a comparison may be made between the desired joint torques Tcmd_R and Tcmd_L of the leg links 3R and 3L, which have been obtained immediately before the negative determination result of step S102 (for example, in the previous control processing cycle of the arithmetic processing unit 51). In addition, the driving torque of the third joint 8 of each leg link 3 may be measured by an appropriate sensor or estimated by an appropriate observer. If this is the case, the observed value (measured value or estimated value) of the driving torque may be used as the value of the reference parameter, instead of the desired value of the driving torque.

Further, the value of the reference parameter may be a value of a physical quantity having constant correlation with the supporting force (the total lifting force share) acting on each leg link 3 from the floor side or with the driving torque of the third joint 8 of each leg link 3. For example, the output torque or applied current of each electric motor 15 or the output torque of each rotary actuator 9 has constant correlation with the driving torque of the third joint 8 of each leg link 3. Therefore, it is possible to use, for example, an observed value or desired value of one of the output torque or applied current of the electric motor 15 and the output torque of the rotary actuator 9 as the value of the reference parameter. Moreover, in the power transmission system 10 according to this embodiment, a force (translational force) generated in the connecting rod 18 in the longitudinal direction thereof in driving the third joint 8 has constant correlation with the driving torque of the third joint 8 of each leg link 3. Therefore, it is possible to use an observed value or desired value of the force generated in the connecting rod 18 in the longitudinal direction thereof as the value of the reference parameter.

Further, in this embodiment, if the determination result is negative in step S102 of FIG. 8, the ratio between the distribution ratios is provisionally set to 1:0 with respect to the ratio between the distribution ratio of the leg link having a greater measured value Fankle_R or Fankle_L of the total lifting force share as the reference parameter and the distribution ratio of the other leg link having a smaller measured value. The predetermined ratio, however, need not always be 1:0. For example, it is possible to set the distribution ratio of the leg link having the greater measured value Fankle_R or Fankle_L of the total lifting force share (or another reference parameter described above) to a value close to 1 and the distribution ratio of the other leg link having the smaller measured value Fankle_R or Fankle_L to a value close to 0.

Moreover, it is possible to set the distribution ratio of the leg link having the smaller measured value Fankle_R or Fankle_L to a negative value (for example, −0.1) and the distribution ratio of the other leg link having the greater measured value Fankle_R or Fankle_L to a positive value (for example, +1.1) while maintaining the sum of the right distribution ratio and the left distribution ratio at 1. Thereby, the embodiment of the fourth aspect of the invention is formed. In this instance, if the distribution ratio is set to a negative value, the rotary actuator 9 of the leg link having the negative distribution ratio generates a driving force in the direction of lifting the foot attachment portion 2 of the leg link 3.

In this regard, for example, if the determination result is negative in step S102 of FIG. 8 immediately before the end of the two-leg supporting period, it is very likely that the user P is going to move the leg on the side of a smaller measured value Fankle_R or Fankle_L as a free leg, with the leg on the side of a larger measured value Fankle_R or Fankle_L of the total lifting force share, which is the reference parameter, as a supporting leg of the legs of the user P. Therefore, in this situation, the user P is able to smoothly move the leg on the side of a smaller distribution ratio by setting the distribution ratio of the leg link having the smaller measured value Fankle_R or Fankle_L (or another reference parameter described above) to a negative value.

Moreover, in order to reduce the load on each rotary actuator 9 (to reduce the required maximum output torque), the control device may be provided with a spring for biasing the third joint 8 of each leg link 3 of the walking assist device A in the stretching direction of the leg link 3. In the case where the spring is provided, the driving torque to be applied to the third joint 8 from the electric motor 15 and further the required torque of the electric motor 15 decrease by the amount of torque of the third joint 8 generated by the spring when the third joint 8 is biased in the stretching direction of the leg link. The torque of the third joint 8 generated by the spring changes according to the knee angle of the leg link 3. Therefore, in the processing of the feedforward manipulated variable determining means 65, the feedforward manipulated variable Iff may be determined by using an equation in which the right-hand side of equation (4) further includes a term in proportion to the knee angle θ1 of each leg link 3, that is, a term for decreasing the electric current of the electric motor 15 generating the driving torque in the stretching direction of the leg link 3 by the amount of electric current equivalent to the torque of the third joint 8 generated by the spring.

Further, the actuator for driving the third joint 8 of each leg link 3 is not limited to the rotary actuator, but may be a linear actuator (for example, a fluid-pressure cylinder actuator with a piston rod pivotally mounted on one of the thigh frame 5 and the crus frame 7 and a cylinder tube pivotally mounted on the other of the thigh frame 5 and the crus frame 7).

Moreover, in cases where the usage pattern of the walking assist device A is limited to a relatively slow motion of the legs of the user P, each feedforward manipulated variable determining means 65 may be omitted to determine the indicator current value Icmd of each electric motor 15 according to the feedback control law such as the PID law on the basis of the deviation ΔF between the control desired value Fcmd and the measured value Fankle of the total lifting force share.

What is claimed is:

1. A control device for a walking assist device, the walking assist device having: a lifting force transmitting portion adapted to be put in contact with a trunk of a user so as to allow an upward lifting force to act on the trunk of the user; a pair of left and right foot attachment portions adapted to be fitted to feet of legs of the user; a pair of left and right leg links which connect the foot attachment portions to the lifting force transmitting portion, respectively, each of the leg links including a thigh frame extending from the lifting force transmitting portion via a first joint, a crus frame extending from each foot attachment portion via a second joint, and a third joint interconnecting the thigh frame and the crus frame so as to freely bend and stretch the thigh and crus frames; and actuators, each of which drives the third joint of the corresponding leg link, wherein the control device has a treading force measuring means which measures treading forces of the legs of the user based on outputs of treading force measurement force sensors mounted on the foot attachment portions of the walking assist device, respectively, such that each of the treading force measurement force sensors is opposed to a base of the foot of the corresponding leg of the user, and the control device controls driving forces of the actuators of the walking assist device so that a proportion between supporting forces respectively acting on the leg links of the walking assist device from the floor side coincides with a predetermined ratio determined according to the measured values of the treading forces of the legs obtained by the treading force measuring means while applying a preset desired lifting force to the trunk of the user from the lifting force transmitting portion of the walking assist device; and wherein the control device comprises:

a treading force total sum decision means which decides whether or not a total sum of the measured values of the treading forces of the legs obtained by the treading force measuring means is greater than a predetermined value; and a predetermined ratio determining means which determines the predetermined ratio, according to observed values of reference parameters which have been observed based on outputs of sensors mounted on the leg links of the walking assist device other than the treading force measurement force sensors or desired values of the reference parameters which have been used for control processing of the driving forces of the actuators of the walking assist device immediately before a negative determination result of the treading force total sum decision means, by using the supporting forces acting on each of the leg links of the walking assist device from the floor side, driving torques of the third joints of each of the leg links of the walking assist device, or physical quantities having correlation with the supporting forces or the driving torques as reference parameters for determining the predetermined ratio, instead of determining the predetermined ratio according to the measured values of the treading forces of the legs of the user, in the case where the determination result of the treading force total sum decision means is negative.

2. The control device for the walking assist device according to claim 1, further comprising:

a supporting force measuring means which measures supporting forces actually acting on the leg links of the walking assist device from the floor side based on outputs of supporting force measurement force sensors interposed between the crus frame and the second joint of each of the leg links of the walking assist device;

a supporting force desired value determining means which determines desired values of the supporting forces respectively acting on the leg links from the floor side so that a proportion between the desired values coincides with the predetermined ratio; and an actuator control means which feedback-controls the driving forces of the actuators of the walking assist device so that the measured values of the supporting forces of the leg links of the walking assist device obtained by the supporting force measuring means follow the desired values determined by the supporting force desired value determining means, wherein the predetermined ratio determining means uses the measured values of the supporting forces of each of the leg links of the walking assist device obtained by the supporting force measuring means or the desired values of the supporting forces of each of the leg links obtained by the supporting force desired value determining means as the reference parameters.

3. The control device for the walking assist device according to claim 2, wherein the predetermined ratio determining means determines the predetermined ratio so that the desired value of the supporting force of a second leg link of the walking assist device is greater than the desired value of the supporting force of a first leg link of the walking assist device, where the first leg link of the walking assist device is one of the leg links having a smaller value of the reference parameter and the second leg link of the walking assist device is the other leg link having a greater value of the reference parameter, in the case where the determination result of the treading force total sum decision means is negative.

4. The control device for the walking assist device according to claim 2, wherein the predetermined ratio determining means determines the predetermined ratio so that the desired value of the supporting force of a first leg link of the walking assist device is a negative value and the desired value of the supporting force of a second leg link of the walking assist device is a positive value, where the first leg link of the walking assist device is one of the leg links having a smaller value of the reference parameter and the second leg link of the walking assist device is the other leg link having a greater value of the reference parameter, in the case where the determination result of the treading force total sum decision means is negative.

* * * * *